Sept. 5, 1933.  R. E. HUNTINGTON  1,925,759
WASHING DEVICE
Filed Sept. 2, 1930    11 Sheets-Sheet 6

Fig. 6

Roy E. Huntington
INVENTOR

BY Munn & Co.
ATTORNEYS

Sept. 5, 1933.  R. E. HUNTINGTON  1,925,759
WASHING DEVICE
Filed Sept. 2, 1930   11 Sheets-Sheet 7

Sept. 5, 1933.  R. E. HUNTINGTON  1,925,759
WASHING DEVICE
Filed Sept. 2, 1930   11 Sheets-Sheet 8

Roy E. Huntington
INVENTOR

BY Munn & Co.
ATTORNEYS

Sept. 5, 1933.  R. E. HUNTINGTON  1,925,759
WASHING DEVICE
Filed Sept. 2, 1930  11 Sheets-Sheet 9

Roy E. Huntington
INVENTOR

BY Munn&Co
ATTORNEYS

Sept. 5, 1933.  R. E. HUNTINGTON  1,925,759
WASHING DEVICE
Filed Sept. 2, 1930   11 Sheets-Sheet 10

Roy E. Huntington
INVENTOR

BY Munn & Co
ATTORNEYS

Sept. 5, 1933.  R. E. HUNTINGTON  1,925,759
WASHING DEVICE
Filed Sept. 2, 1930   11 Sheets-Sheet 11

Roy E. Huntington
INVENTOR

BY
ATTORNEYS

Patented Sept. 5, 1933

1,925,759

UNITED STATES PATENT OFFICE 1,925,759

WASHING DEVICE

Roy E. Huntington, Milwaukee, Wis.

Application September 2, 1930
Serial No. 479,246

7 Claims. (Cl. 15—21)

My invention relates to improvements in washing devices, and it consists in the combinations, constructions, and arrangements herein described and claimed.

An object of my invention is to provide a washing device in which means is provided whereby reflectors and the like may be washed by mechanical apparatus and in which novel means is provided whereby the device is easily manipulated and adjusted to accommodate the washing mechanism to various operating conditions.

A further object is to provide a washing device in which a power-propelled unit may be employed and associated with a movable head mechanism for washing reflectors, and in which the head mechanism may be elevated or extended with respect to the power-propelled unit for adjusting the head mechanism to the reflector.

A further object is to provide a washing device in which movable and adjustable means is provided for cleaning reflectors and the like and in which the power means for operating the cleaning mechanism is also adapted to function as a conduit system for suitable cleaning liquids.

A further object is to provide a washing device in which novel mast means is employed in connection with a cleaning head, whereby the cleaning head is permitted a maximum degree of adjustment and flexibility.

A further object is to provide a washing device in which a power-driven vehicle is used for moving the device from place to place, and in which a cleaning mechanism is connected with said source of power whereby the necessity for manual operation is entirely eliminated.

A further object is to provide a device of the type described in which a liquid medium may be employed for cleaning reflectors by mechanical apparatus and in which the device is constructed in such a manner that I have entirely eliminated all splashing and the like.

A further object is to provide a device of the type described in which a novel head construction is employed, whereby reflectors and the like may be rigidly held during the cleaning process, and in which means is also provided whereby the necessity for disconnecting the reflectors is eliminated.

A further object is to provide a device of the type described in which means is employed for cleaning the lamps simultaneously with the cleaning of the reflectors.

Other objects and advantages will appear in the following specification, and the novel features of the invention will be particularly pointed out in the appended claims.

My invention is illustrated in the accompanying drawings, forming part of this application, in which.

Figure 1:
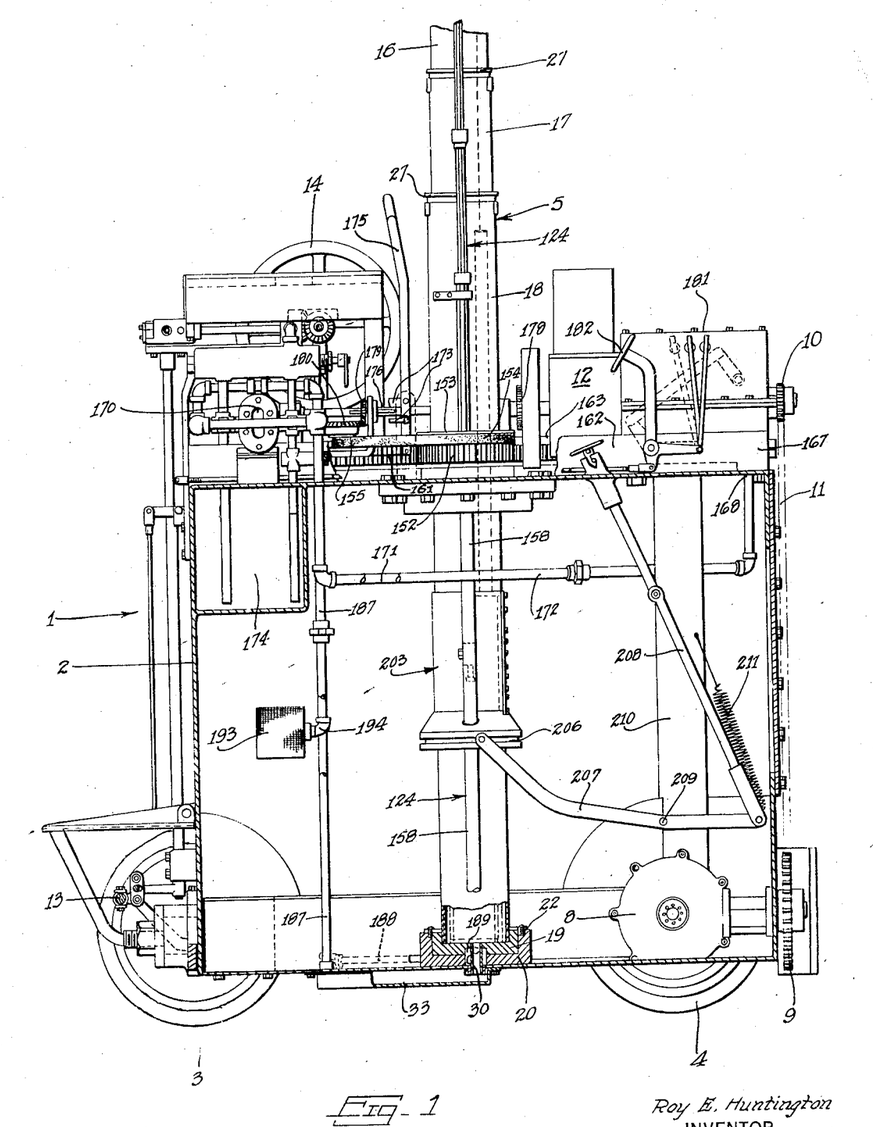
Figure 1 is a side elevation of my device showing the mast and head structure removed therefrom.
Figure 2:
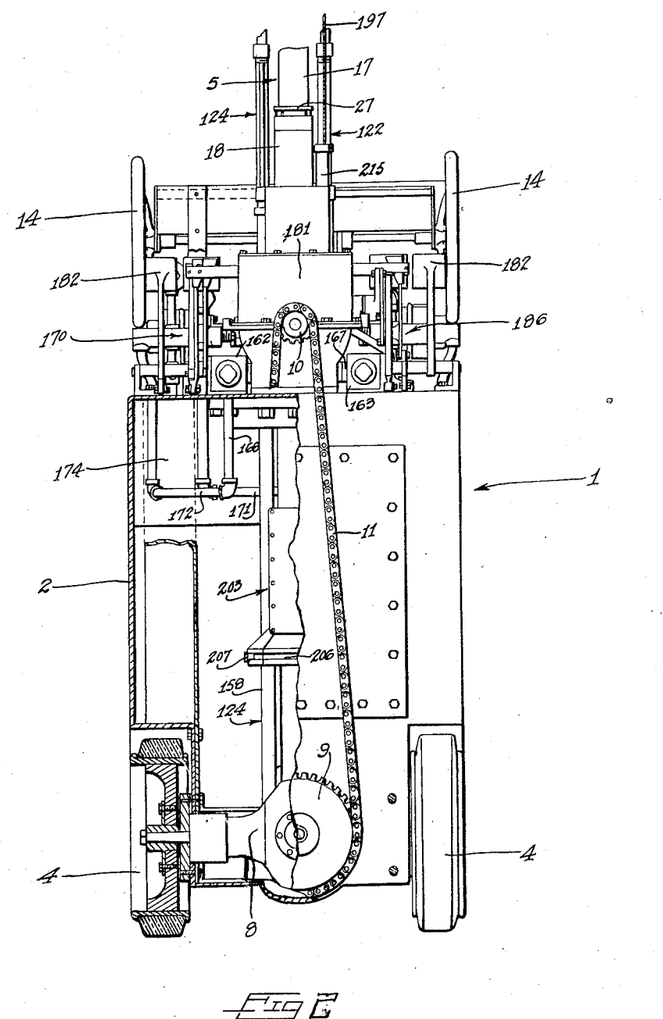
Figure 2 is a front elevation, partly in section, of my device.
Figures 18, 19, 20:
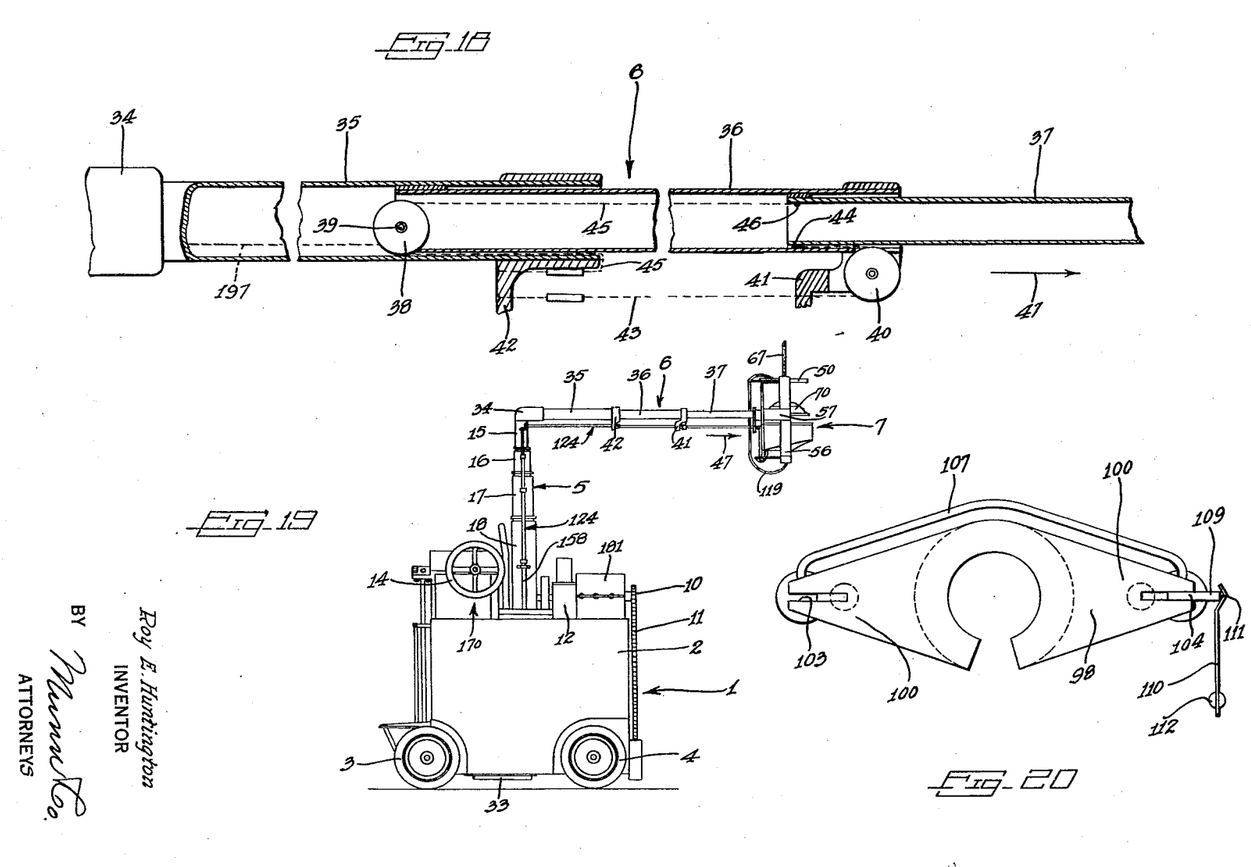
Figure 18 is a sectional detail view of a portion of the boom.
Figure 19 is a side elevation of my device showing a reflector in connection with the head structure.
Figure 20 is a detail view of a portion of my invention.

In carrying out my invention, I make use of a power-propelled vehicle 1, see Figures 1 and 19, comprising in part a tank 2 mounted upon wheels 3 and 4. A mast 5 is carried by the vehicle and is provided with a boom 6, which, in turn, is provided with a head 7. The mast 5 and the boom 6 are adjustable to accommodate the head to various operating conditions, as will be more clearly explained later. The wheels 4, see Figure 1, are associated with a differential mechanism 8 which is connected with a sprocket 9. The latter is operatively connected with a sprocket 10 through the medium of a chain 11. The chain 11 is merely diagrammatically shown for the sake of clearness in Figure 1. Figure 19 shows the chain in elevation. A power unit 12 may be mounted upon the tank 2 for driving the sprocket 10. The power unit also operates other mechanism which will be described later. The wheels 3, see Figure 3, may be moved for steering the vehicle through a suitable mechanism 13 which is preferably operated through the medium of hand wheels 14, see Figures 1 and 19.

Figures 7, 8, 9:
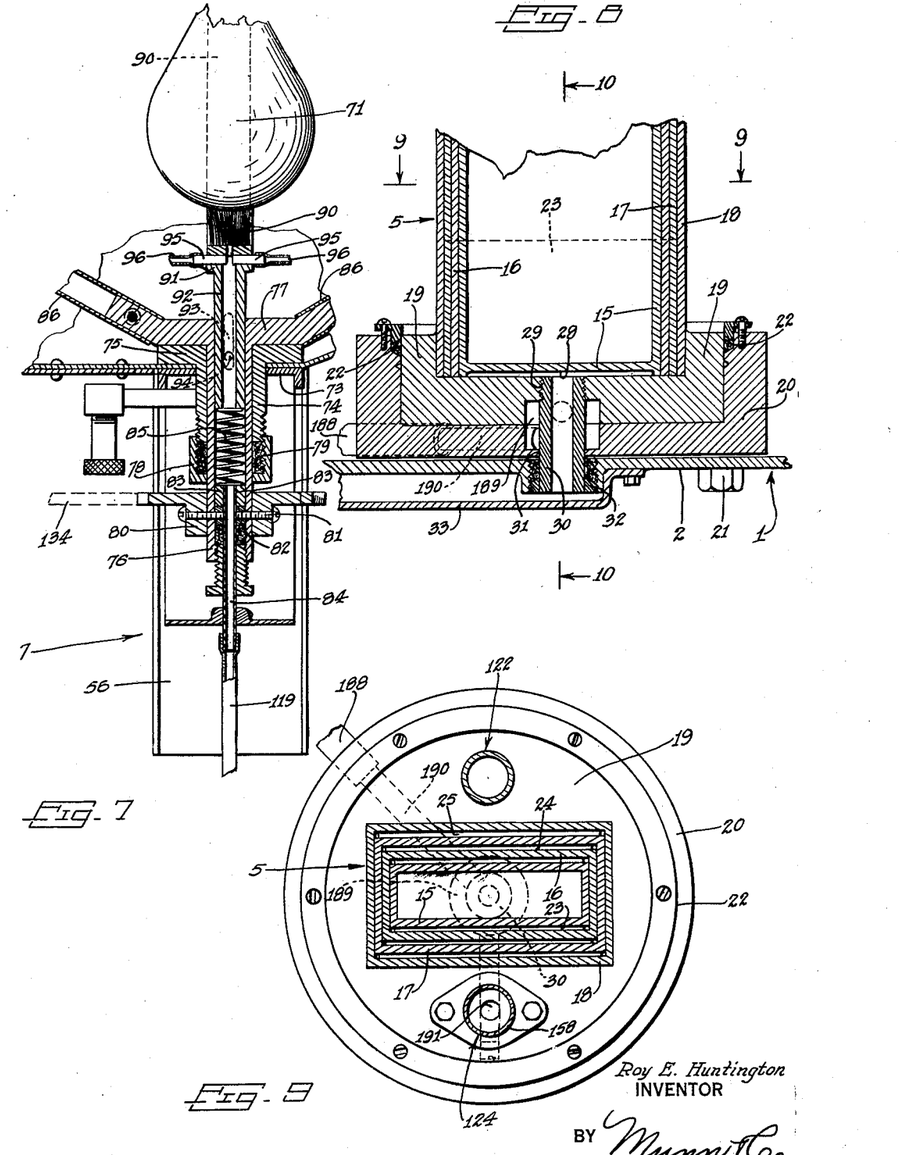
Figure 7 is an enlarged sectional view of a portion of the head mechanism.
Figure 8 is an enlarged detail view of the base mounting for the mast.
Figure 9 is a sectional view taken along the line 9—9 of Figure 8.
Figure 10:
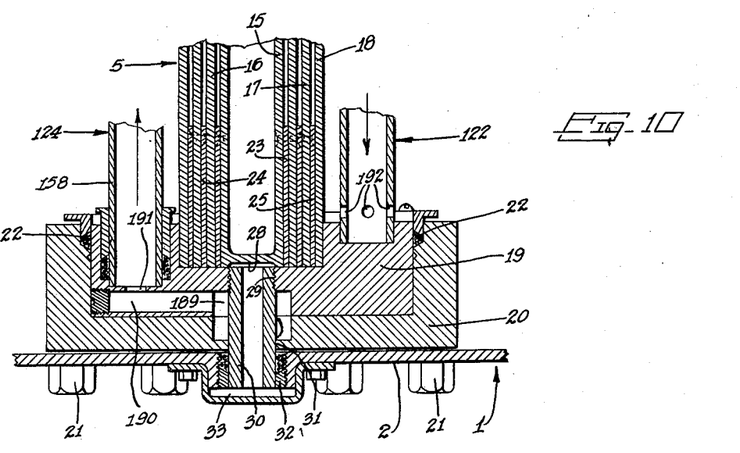
Figure 10 is an enlarged detail view taken along the line 10—10 of Figure 8.

The mast 5 comprises a plurality of hollow sections 15, 16, 17, and 18, see Figures 8, 9, and 10. The section 18 substantially encloses the other sections. The sections are preferably rectangular in cross section, see Figure 9. The outer section 18 has one end rigidly secured within a rotatable base element 19. The latter is mounted within a base bearing 20. The bearing may be bolted to the bottom of the tank through the medium of bolts 21. A suitable stuffing box 22 is associated with the base element 19 and the base bearing 20.

Figure 15:
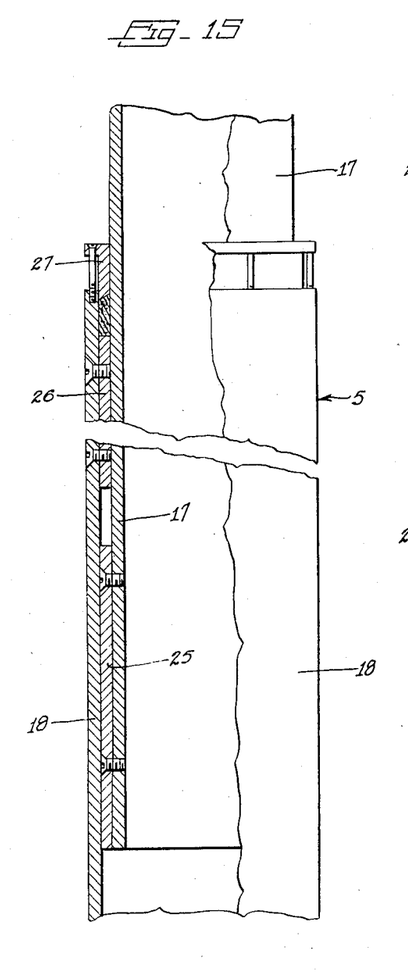
Figure 15 is an enlarged detail view of a portion of the mast.

Referring again to Figures 8, 9, and 10, it will be noted that the sides of the sections 15 to 18, inclusive, are spaced apart and that their edges fit snugly against one another. Filler plates 23, 24, and 25, see Figure 10, are provided for holding the sections in their spaced-apart relation. The plates 23 are associated with the section 15, the plates 24 are associated with the section 16, and the plates 25 are associated with the section 17. In Figure 15, I have shown an enlarged detail of one of the plates. In this view I have shown the section 18 as being provided with an abutment plate 26 at its upper end. The plate 25, associated with the section 17, is arranged to engage the abutment member when the section 17 has been shifted to its extreme extended position. The upper ends of the sections 18, 17, and 16 are each provided with abutment plates such as that indicated at 26. Thus it will be seen that the mast may be extended a given distance, and that the sections are held in operative assembly. A suitable stuffing box 27 is provided in connection with the end of each of the sections 15 to 18, inclusive.

Let us return to Figures 8, 9, and 10. The lower end of the section 15 is recessed at 28. The base element 19 is provided with a threaded opening 29 for receiving the threaded end of a short pipe 30. The pipe 30 passes through an opening 31 in the base bearing 20. The end passing through this opening is surrounded by a stuffing box 32. The end of the pipe communicates with a pan 33 which may contain an oil which, when forced through the pipe 30, bears against the end of the section 15 and lifts the latter. The oil in being forced through the pipe 30 will lift all of the sections, with the exception of the section 18, until the mast has been extended its maximum distance. The mast may, however, be extended various amounts by merely increasing the amount of oil which passes through the pipe 30.

It will be understood, of course, that while I have discussed oil as being used as a medium for lifting the mast, any other suitable liquid may be successfully used, and this is intended to be within the scope of the invention.

Figures 16, 17:
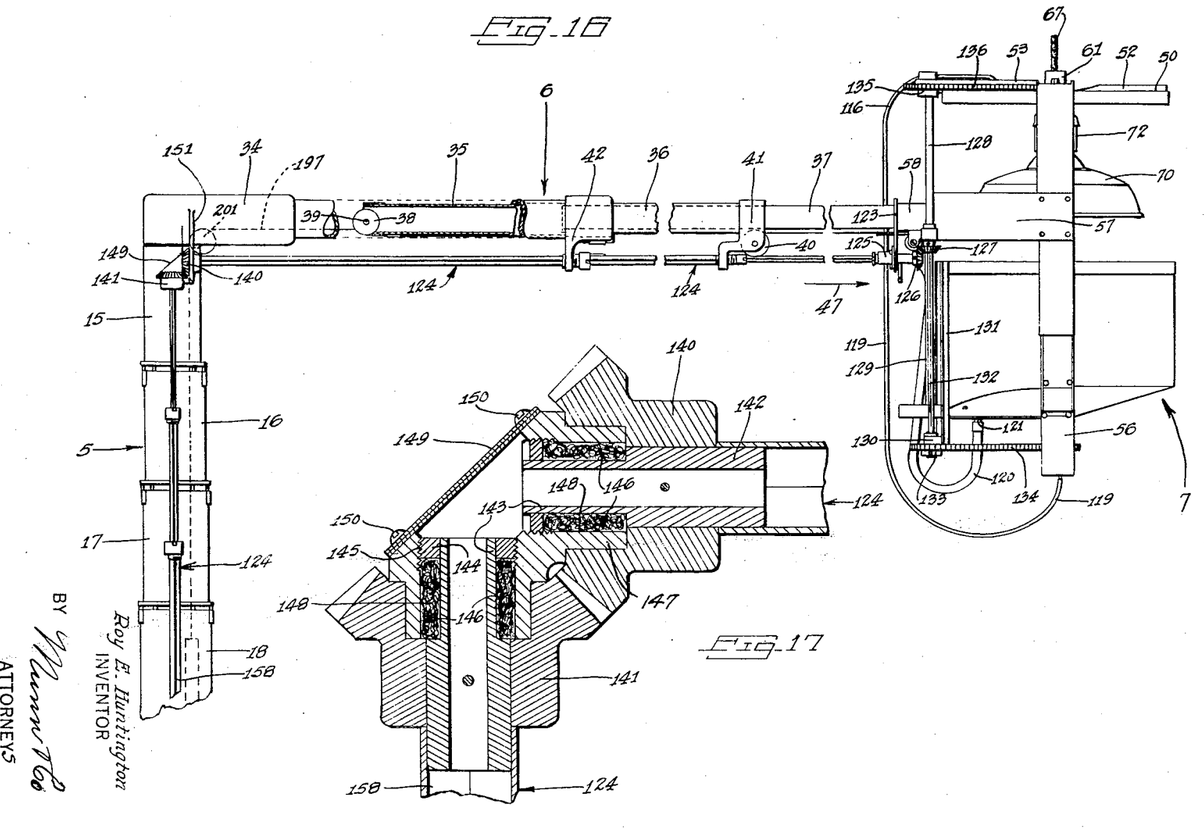
Figure 16 is a side elevation of the head mechanism in connection with the major portion of the mast structure.
Figure 17 is an enlarged sectional detail view of a combination conduit and power transmitting unit.

The upper end of the section 15 is connected with a casting 34 which is associated with a section 35 of the boom 6, see Figures 16 and 18. The section 35 is, of course, rigidly supported by the casting 34. The boom 6 comprises the section 35, and sections 36 and 37. The sections 35, 36, and 37 are hollow and the end of the section 36 is slidably disposed within the section 35, while one end of the section 37 is slidably positioned within the section 36. This construction provides a telescopic function. The head 7 is carried by one end of the section 37.

One end of the section 36, see Figure 18, is provided with a grooved wheel 38 which may be mounted upon a shaft 39 fixed to the section 36. A similar grooved wheel 40 is carried by a bracket 41 which is fixed to the opposite end of the section 36. A similar bracket 42 is connected with one end of the section 35. A chain or cable 43 is connected at one end with the bracket 42 and passes around the wheel 40 and is connected with the section 37 by any suitable means as at 44. A second cable or chain 45 has one end connected with the bracket 42, passes around the end of the section 35, around the grooved wheel 38, and is connected with the section 37 as at 46.

Thus it will be seen that when the section 37 is moved in the direction of an arrow 47, the section 36 will be similarly moved through the medium of the chain 45. For the sake of clearness, the manner in which the boom 6 and the mast are operated will be explained later. Suffice to say that the mast is extended or contracted by a liquid-operated mechanism.

The head 7 comprises in part a disc portion 50 having a V-shaped opening 51. The edges of the opening 51 may be bent for forming flanges 52, see Figures 4, 5, and 6. A T-shaped supporting member 53 is spaced slightly from the disc portion 50 by means of spools 54 and rigidly secured to the disc through the medium of bolts 55 which pass through the T-shaped member, the spools, and the disc. The member 53 is bent to provide downwardly extending portions 56. The latter are substantially channel shaped in cross section. The portions 56 are diametrically positioned and are, in turn, connected with a fork 57. The latter is provided with a tubular extension 58, see Figure 5, which is disposed upon one end of the section 37 of the boom 6 and is secured thereto by means of bolts 59.

Figure 5:
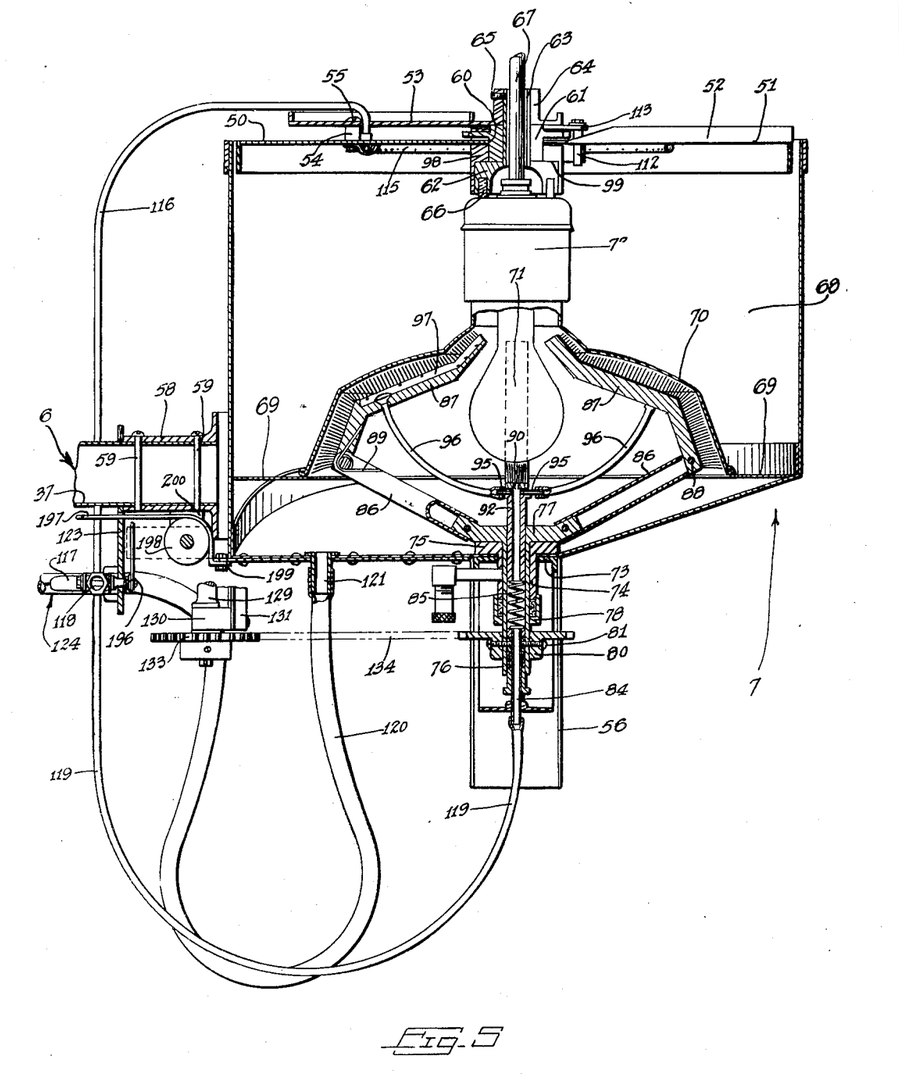
Figure 5 is a sectional view in elevation of the head construction.

The disc 50 is provided with an opening 60 through which a portion of a sprocket 61 projects. One end of the sprocket hub bears against the supporting member 53, while the opposite end of the sprocket hub bears against a portion of a cupped member 62 having a stem 63 projecting through the sprocket 61 and a boss 64 associated with the supporting member 53.

The stem 63 is rigidly secured to the boss 64 by means of a screw or bolt 65. The cupped member 62 is provided with an annular flexible ring 66. The ring, the cupped member 62, its sleeve, the sprocket 61, and the boss 64 are slotted, see Figure 4. The slots in these elements communicate with the slot or opening 51 so that a lamp cord 67, see Figure 5, may be centrally positioned as shown. The opening in the sleeve 63 is sufficiently large to freely receive the lamp cord. The lamp cord 67 may be positioned as shown in Figure 5 by merely extending the head 7 in the direction of the cord and aligning the opening 51 for receiving the cord when the head has been extended a sufficient distance.

A splash tank 68 is positioned between the guides 56 and arranged to be moved toward and away from the disc or cover 50. The splash tank is provided with a tapered bottom as will be noted by referring to Figures 5 and 6. The tank is further provided with a perforated flange 69 upon which a lamp reflector 70 may be positioned. A lamp 71 is associated with the reflector. The latter is provided with a base portion 72 which may be moved into engagement with the ring 66 when the splash tank is positioned as shown in Figure 5. Normally the splash tank is positioned as shown in Figure 16. The latter figure shows the relative position of the splash tank with respect to the top 50 while the reflector is being positioned in the head.

A channel-shaped member 73 is secured to the bottom of the splash tank. This member and the bottom are provided with an opening through which a flanged bushing 74 projects. The latter is provided with a flange 75 which is disposed adjacent the inner side of the tank bottom surrounding the opening. This structure is more clearly shown in Figure 7.

A hollow stem 76, connected with a yoke 77, passes through the bushing 74. The stem is arranged for rotation within the bushing. One end of the stem may be threaded for receiving a cap 78 enclosing a packing gland 79. A sprocket 80 is secured to the stem 76 by means of bolts or screws 81. An abutment member 82 is disposed within the stem 76 and made secure therein by means of screws 81. A head 83 is disposed adjacent the abutment member 82 and is provided with an opening for receiving a pipe 84. The pipe is rigidly connected with the head. The head supports a coil spring 85. The yoke 77 rotates within the flanged bushing 74. The head 83, together with the pipe 84, remains stationary during the rotation of the yoke 77. The yoke is connected with arms 86, see Figure 5, which, in turn, are operatively connected with brushes 87. The brushes are pivotally connected with the arms at 88. Suitable springs 89 may be provided for normally holding the brushes in such positions that the lamp 71 may be freely positioned between the brushes as shown in Figure 5. In other words, the springs 89 tend to pivot the brushes about their axes 88 for moving the free ends of the brushes apart. The brushes, of course, align with the reflector 70 when they are positioned as shown in Figure 5. The positioning is incidental to the movement of the splash tank from the position shown in Figure 16 to that shown in Figure 5.

Figure 6:
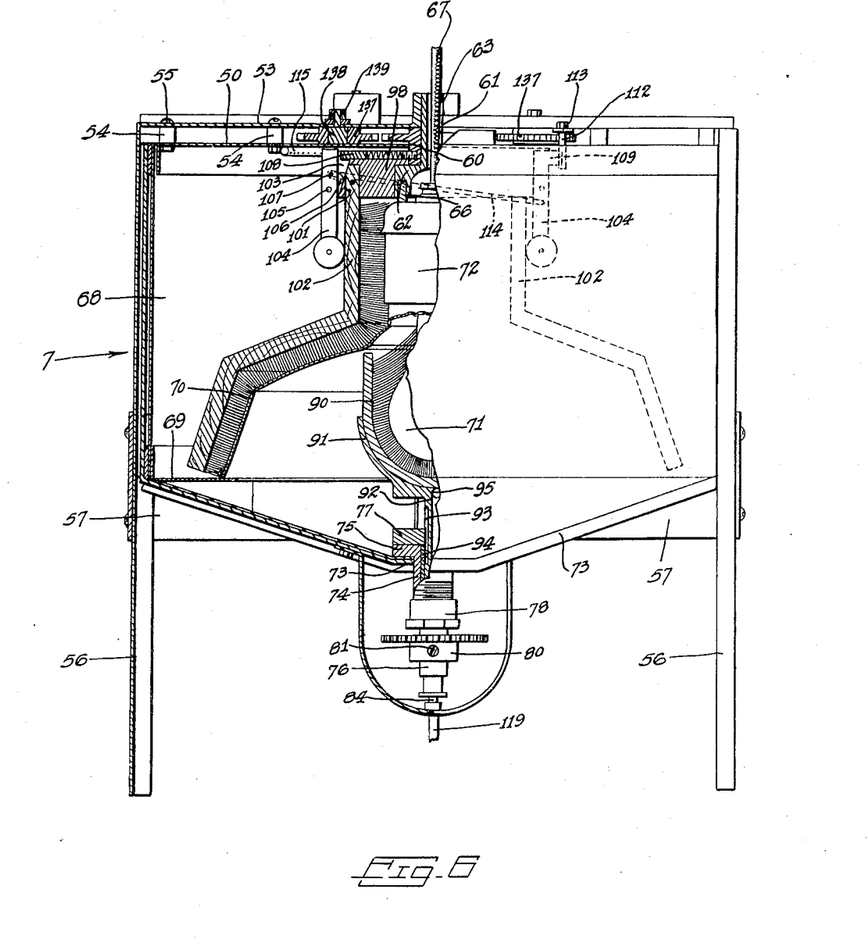
Figure 6 is a side elevation, partly in section, of the head construction taken from a different angle.

Means for cleaning the lamp 71 comprises a brush 90 which is connected with a yoke 91 having a sleeve 92 slidably positioned within the stem 76. The end of the sleeve 92 rests upon the coil spring 85. Referring to Figure 6, it will be noted that the sleeve 92 is provided with a groove 93 within which a pin 94, carried by the stem 76, is disposed. The pin 94 limits the movement of the sleeve 92 within the stem 76. The brush 90 is substantially U-shaped in construction and the bristles are formed in such a manner that lights of various sizes may be cleaned by means of a single brush. The spring 85 tends to hold the brush 90 in operative engagement with the light 71.

The yoke 77 is provided with a pair of pipe portions 95. The latter are connected with flexible tubular members 96 which, in turn, are connected with the brushes 87 for conveying liquid to compartments 97 in the brushes 87. The brushes are perforated so that water may pass through the bristles for washing the reflector as well as the lamp 71. In Figure 5 I have shown the brushes for cleaning the inner side of the reflector, and in Figure 6 I show the brushes which are used for cleaning the outer side of the reflector. The latter brushes will be defined later. In all cases the reflector remains stationary, while the brushes are rotated.

Let us refer to Figures 5, 6, and 20. A casting 98 is fixed upon the hub portion of the sprocket 61. The casting is recessed as at 99 for receiving the cupped member 62. The casting is further provided with extensions 100, see Figures 6 and 20, which have openings 101 for receiving the ends of brushes 102. These brushes are arranged for cleaning the outer side of the reflector. The ends of the extensions are slotted as at 103 for receiving ends of ball-supporting members 104. These members may be pivotally mounted as at 105. One of the extensions of the casting 98 is provided with a slot 106 for receiving one end of a link 107 which is connected with one of the members 104 through the slot. The opposite end of the link is connected with the other of the members 104. One end of one of the members is arranged to bear against a spring-pressed pin 108, while the other member is provided with a lug 109 arranged for engagement with a flexible spring member 110, see Figure 20. The spring member is depressed as at 111 for receiving the end of the lug 109. The flexible member is mounted upon a bolt 112 which, in turn, is carried by a lug 113 associated with the supporting member 53.

In referring to Figure 6 it will be noted that the link is arranged so that one end is connected with one of the members 104 above its pivot pin 105, and the opposite end of the link is connected with the other of the supporting members 104 below its pivot pin. Any spreading of the members 104 occurs simultaneously by reason of the link connection. The casting 98 is provided with a slot, in one of its sides, which aligns with the slot in the sprocket 61. Rotation of the sprocket causes a rotation of the casting, since the latter is rigidly connected with the sprocket.

The lug 109 in being engaged by the depressed portion of the spring member 110 aligns the casting 98 and its associated mechanism so that the lamp cord may be properly positioned as shown in Figure 5. In other words, the spring member 110 stops the brush-rotating mechanism at a predetermined position.

The supporting members 104 spread as soon as the brush mechanism is rotated so that the lug 109 will be freed from the spring member 110. The spring pressed pin 108 tends to positively move the members 104 to the positions shown in Figure 6.

Means for spraying liquid upon the outer surface of the reflector 70 in connection with the brushes 102 comprises a perforated tube 115. This tube is bent into the form of a circle and is connected with a fluid-conveying tube 116, see Figure 5. This tube is connected with a pipe 117, see Figure 4, in close proximity to a valve 118. A second liquid-conveying tube 119 is connected with the pipe 117 and the pipe 84 associated with the stem 76, see Figures 5 and 6. It will now be seen that water or any other cleaning fluid may pass through the brushes 87 and to the brushes 102 through the perforated tube 115. The tube 115 is mounted underneath the disc 50.

A tube 120 is connected with a piece of pipe 121 which communicates with the interior of the splash tank 68. The pipe is secured to the bottom of the tank. The opposite end of the tube is connected with one end of a section of a telescopic conduit 122. The end of the conduit is connected with a plate 123 which may be mounted upon the section 37 of the boom 6. The plate is preferably positioned adjacent the end of the extension 58. The plate also supports one end of a propelling conduit 124. The pipe 117 communicates with the conduits 122 and 124. This communication may be cut off through the medium of the valve 118. The propelling conduit 124 is rotatable, while the conduit 122 is merely telescopic. The conduit 124 is also telescopic.

The conduits are supported by the brackets 41 and 42. The sections comprising the conduit 124 are preferably hexagonal in cross section, which permits the sections to be moved in a telescopic sense with respect to one another. The sections, however, are operatively connected together during the rotation of the conduit.

One section of the conduit 124 passes through a casting 125, which is secured to the plate 123 and is operatively connected with a bevel gear 126, see Figure 16. This gear is arranged in mesh with a bevel gear 127 associated with a tubular shaft 128. A companion shaft 129 passes through the gear 127 and into the tubular shaft 128. The companion shaft may be moved into or out of the tubular shaft and rotates with the latter. The lower end of the companion shaft 129 is supported by a bearing 130 which is mounted upon a supporting channel 131. The latter may be connected with the splash tank as by welding at suitable points. The companion shaft 129 is slotted as indicated at 132 for receiving a lug which may be a part of the gear 127.

Thus it will be seen that rotation of the gear causes a rotation of the shaft, but that the shaft is free to move through the gear in the direction of its longitudinal axis. One end of the companion shaft 129 is provided with a sprocket 133, see Figure 5, which is aligned with the sprocket 80. These sprockets may be connected by means of a chain 134, see Figure 16. The chain has been indicated generally in dotted lines in Figure 5 for the sake of clearness.

Figure 4:
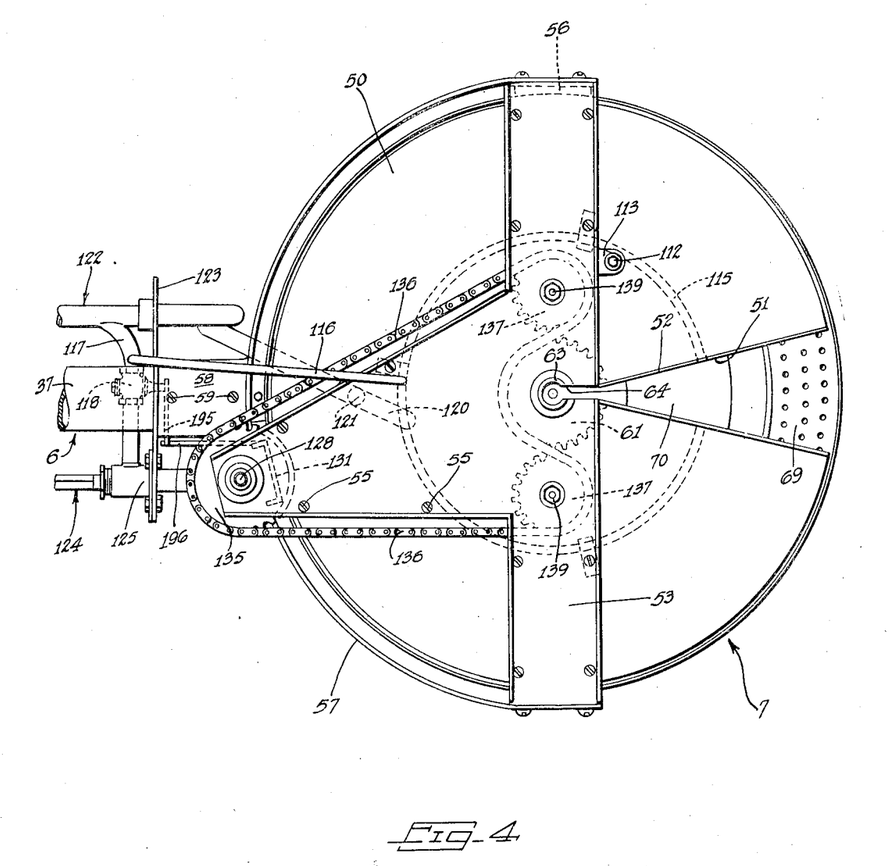
Figure 4 is a top plan view of the head construction.

The upper end of the shaft 128 is connected with a sprocket 135, see Figure 4, around which a chain 136 passes. This chain passes around a pair of idler sprockets 137. One of these sprockets is shown in sectional elevation in Figure 6. The sprockets may be mounted upon bearing elements 138 which are disposed between the disc portion 50 and the supporting member 53. The bearing elements may be secured in position by means of nuts 139. The chain 136 also passes around the sprocket 61. Thus it will be seen that the inner brushes 87 and 90 and the outer brushes 102 are rotated through the medium of chains 134 and 136 whenever the propelling conduit 124 is rotated.

One end of one of the sections comprising the propelling conduit 124 is provided with a bevel gear 140, see Figures 16 and 17, for meshing with a similar gear 141 mounted upon one end of a companion section of the conduit. These gears are fixed upon hollow members 142 which are rigidly connected with companion sections of the conduit. The members 142 extend through the gears and are provided with reduced portions 143 upon which packing nuts 144 are disposed. These nuts have threaded relation with threads 145 cut in the sides of openings 146 in a casting 147.

The nuts 144 have a sliding relation with the extensions 143 and are arranged for compressing suitable packing material 148. The casting is provided with a cover 149 which may be secured in position by means of bolts or screws 150. The construction is such that a liquid may flow through the conduit as well as its transmission mechanism comprising the gears 140 and 141. The casting 34 is provided with arms 151 for supporting the conduits. The conduit 124 is alone provided with the gear transmission, since the purpose of the conduit 122 is merely to serve as a liquid-conveying means.

Figure 3:
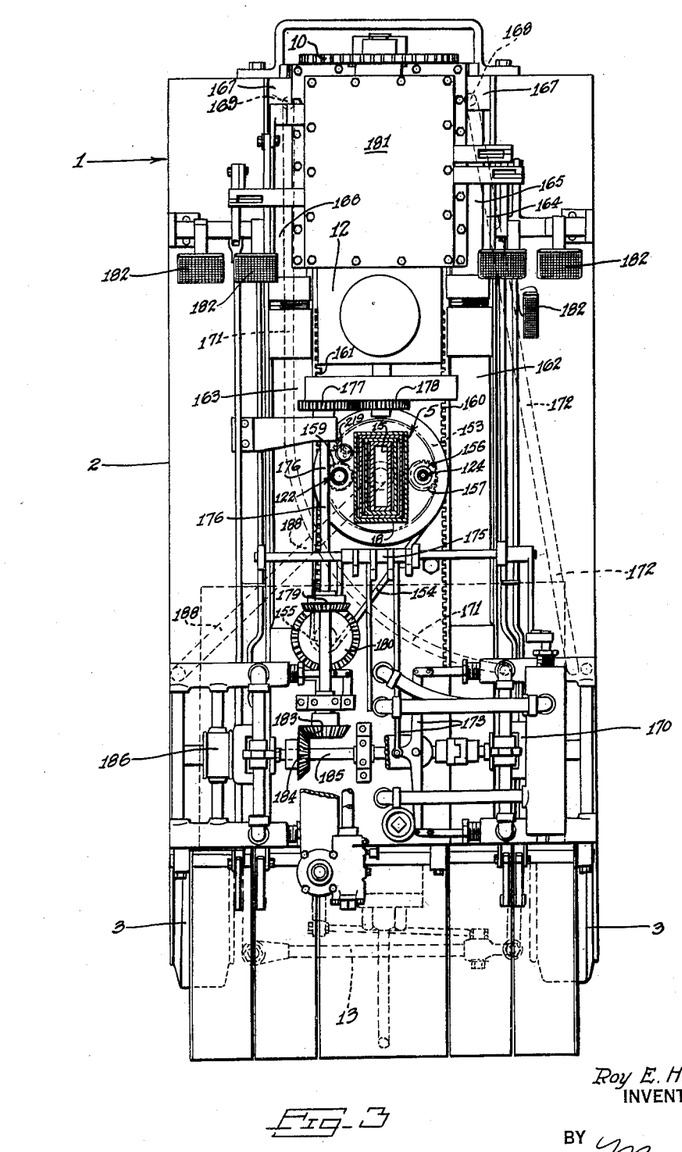
Figure 3 is a top plan view showing the mast removed.

Let us now refer particularly to Figures 1 and 3. A gear 152 is mounted upon the tank 2. The section 18 of the mast 5 passes through an opening in the gear. The opening conforms to the cross sectional shape of the section so that any rotation of the gear will rotate the mast a similar distance. The gear 152 supports a flanged pulley 153 around which a belt 154 passes. The flanged pulley may be rotated independently of the gear 152. The belt also passes around a smaller pulley 155, see Figure 3. The flanged pulley is provided with an internal gear 156, see Figure 3, which is in mesh with a spur gear 157 secured to a section 158 connected with one section of the conduit 124. The sections comprising the conduit are hexagonal in cross section with the exception of the section 158. Movement of the gear 156 will, of course, rotate the conduit since this gear is fixed to the section 158. An idler gear 159 is also in mesh with the internal gear 156 and idles upon the conduit 122. This gear functions as a balancing element for the gear 157 and its companion gear 156.

A pair of racks 160 and 161 is arranged to mesh with the gear 152. The racks are cut in or formed from the sides of cylinders 162 and 163. The cylinders are slidably mounted upon suitable tracks 164. The cylinders 162 and 163 are provided with hollow rams 165 and 166, respectively. The rams project to the exterior of the cylinders and may be secured to the tracks 164 at 167. At 168 and 169 I have shown openings communicating with the interior of the rams 165 and 166, respectively. A liquid, such as oil, may be forced through the rams and into the cylinders for moving the latter. The cylinders are arranged to be moved simultaneously in opposite directions, whereby the gear 152 may be rotated. The rams are connected with an oil pump 170 through the medium of conduits 171 and 172. The conduits 172 may be seen in elevation in Figure 1. Both conduits may be disposed in the same plane as when viewing Figure 1 so that only one of the conduits may be seen. Figure 3, however, shows both of the conduits in dotted lines.

The pump 170 is provided with lever means 173 whereby the pump may be operated for simultaneously moving oil through the conduits 171 and 172 in opposite directions, whereby the racks 160 and 161 are moved for rotating the gear 152. In Figure 1 I have shown an oil chamber 174 for supplying the pump with the necessary quantity of oil. It will be understood, of course, that any one of the many standard pump constructions may be employed in connection with my invention for operating the racks. The specific pump construction forms no part of the present invention, since there are many pumps which may be employed for this purpose. One of the levers 173 is connected with a control lever 175.

The power unit or motor 12 is operatively connected with a shaft 176 through the medium of gears 177 and 178. The shaft 176 is provided with a bevel gear 179 which is disposed in mesh with a gear 180 associated with the pulley 155. Thus it will be seen that the internal gear 156 may be moved for rotating the spur gear 157. The motor 12 is associated with a transmission case 181. Various control devices 182 may be connected with the transmission mechanism within the case for controlling the motor. The shaft 176, see Figure 3, is provided with a bevel gear 183 which meshes with a gear 184. The latter is mounted upon a shaft 185 which is operatively connected with the oil pump 170 and a pump 186.

A pipe 187, see Figure 1, connects the pump 170 with the pan 33. The pan is shown in detail in Figurse 8 and 10. The pump 186 is provided with a pipe 188, see Figures 1, 3, 8, and 9, which communicates with an opening 189 in the base element 19 and the base bearing 20. The base element 19 is further provided with an opening 190 which communicates with the opening 189 and which is placed in communication with the interior of the section 158 by means of an opening 191. Thus it will be seen that a liquid, such as water, may be forced by the pump 186 into the propelling conduit 124. The liquid passes through this conduit in the direction of the head 7 and returns to the tank 2 through the conduit 122. The pipe 117, shown in Figure 4, places the two conduits in communication with each other.

Referring to Figure 10 it will be noted that the section of the conduit 122 connected with the base element 19 is provided with a plurality of openings 192. These openings permit the liquid to return to the tank 2. In Figure 1 I have shown a strainer 193 as being connected with a pipe 194 which leads to the pump 186. The boom 6 may be extended for forcing water into the propelling conduit 124. At this time, the valve 118 is closed for cutting off the communication between the conduits 122 and 124. When, however, the valve is opened, the liquid circulates through the conduits. During the circulation of the liquid, a certain amount will flow through the tubes 116 and 119, see Figures 4 and 5, for conveying water and the like to the brushes.

The valve 118 is automatically opened when the splash tank 68 is moved from the position shown in Figure 16 to that shown in Figure 5. In referring to Figure 4 it will be noted that the valve is provided with a lever 195 which is positioned in the path of an arm 196 rigidly secured to the supporting channel 131. The arm 196 engages the lever 195 for opening the valve when the splash tank is raised. The valve is of the type which closes automatically when the arm 196 is moved downwardly with the splash tank.

Means for raising the splash tank comprises a cable or rope 197, see Figure 5, which passes over a pulley 198 and is connected at 199 with the bottom of the splash tank. The pulley may be secured to a bracket 200 which is connected with the tubular extension 58. The cable 197 passes along the side of the boom 6, see Figure 16, around a wheel 201 supported by the casting 34, and passes downwardly and is wound about a spring-operated drum 202, see Figure 11.

Figures 11, 12:
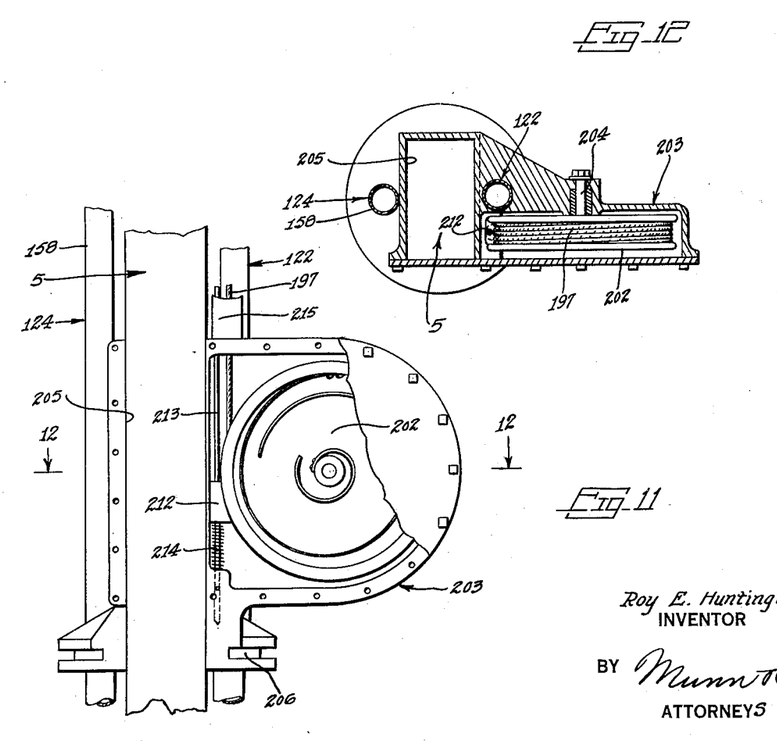
Figure 11 is an enlarged detail view of a portion of the head-operating equipment.
Figure 12 is a sectional view taken along the line 12—12 of Figure 11.

The drum is disposed within a casing 203 and may be mounted upon a bearing bolt 204. The casing 203 is provided with a rectangular opening 205 through which the base portion of the mast 5 passes. In other words, the casing, which may be defined as a drum casing for the sake of clearness, is slidably mounted upon the mast. The casing is provided with a flanged construction 206 which is operatively connected with a lever 207. The latter is connected with a foot rod 208 whereby the drum casing may be lowered.

The rod 208, together with its lever 207, is positioned within the tank 2. The lever 207 is preferably pivotally mounted at 209 upon any suitable supporting structure within the tank. In the present instance I have shown an upright member 210 to which the lever may be connected. The foot rod 208 is provided with a spring 211 which tends to move the drum casing downwardly whenever the foot rod 208 is released. The drum casing is shown in its highest position in Figure 1.

Normally the spiral spring associated with the drum 202 takes up the slack in the rope or cable 197. When it is desired to raise the splash tank 68, the drum casing 203 is moved downwardly upon the mast. The drum casing moves sufficiently far to bring the splash tank 68 in operative relation with the top portion of the head. The brake drum 202 must be held against rotation during the shifting of the splash tank. This is accomplished by means of a brake shoe 212, see Figure 11. Normally the brake shoe is free from the drum. In other words, the brake shoe is moved into frictional engagement with the brake drum whenever the drum casing is moved downwardly.

The brake shoe is mounted upon a rod 213. A spring 214 bears against one end of the brake shoe for yieldingly holding the brake shoe in its engagement with the drum. The brake shoe is moved against the tension of the spring 214 whenever it is moved away from the drum.

Figure 13:
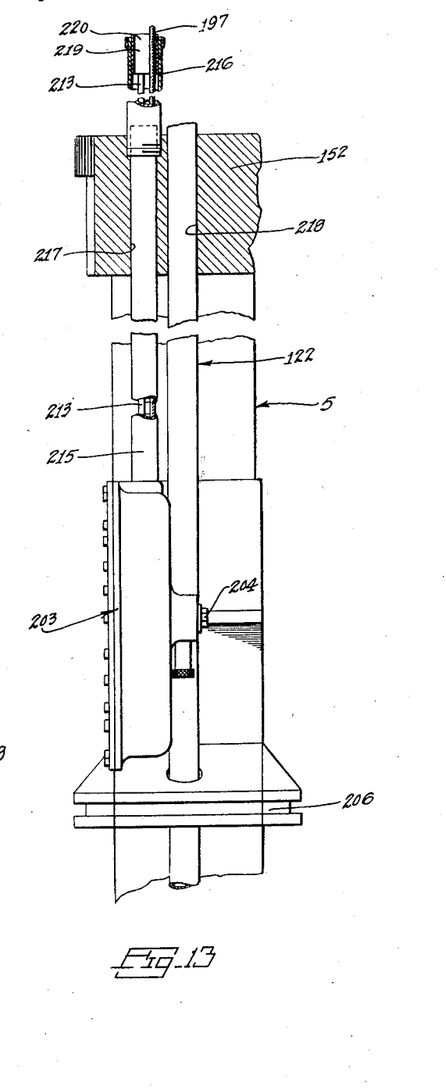
Figure 13 is a view of the structure shown in Figure 11 taken from a different angle.
Figure 14:
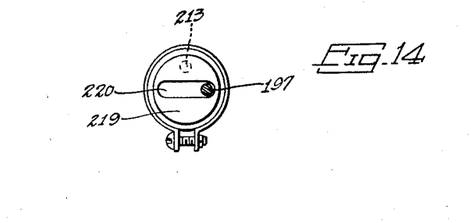
Figure 14 is a detail view of a portion of the structure shown in Figure 13.

The rod 213 passes from the drum casing and through a tube 215, see Figure 13. The cable or rope 197 also passes through this tube. One end of the tube 215 is connected with the drum casing and moves with the latter, while the opposite end of the tube is slidably disposed within a companion tube 216. The latter is connected with the gear 152. The gear is provided with openings 217 and 218 through which the tube 215 and the conduit 122 pass. One end of the tube 215 is slidably positioned within the tube 216. The upper end of the tube 216 is provided with a plug 219 against which the rod 213 may abut. The plug 219 is provided with a slot 220 for receiving the cable 197, see Figure 14.

When the drum casing 203 is moved downwardly, the tube 215, together with the rod 213, moves therewith. Normally the rod 213 is positioned in engagement with the plug 219, at which time the brake shoe 212 is held out of frictional engagement with the drum. As soon, however, as the drum casing is moved downwardly, the spring 214 moves the brake shoe into engagement with the drum, whereby the drum is held against rotation. Since the cable 197 is normally in a taut condition by reason of the spring-operated drum 202, it will be seen that when the drum casing is moved downwardly, the drum is locked against rotation by reason of the brake shoe, and that the splash tank 68 will be lifted through the medium of the cable or rope 197.

The drum casing, as previously stated, is moved downwardly through the medium of the lever 207 in connection with the foot rod 208. When the drum casing returns to its normal position, the rod 213 is moved into engagement with the plug 219, at which time the brake shoe is again moved out of engagement with the brake drum. Under such conditions, the spring-operated drum automatically takes up any slack in the cable 197.

From the foregoing description of the various parts of the device, the operation thereof may be readily understood. Normally the splash tank 68 is positioned as shown in Figure 16. In other words, the splash tank is positioned a certain distance away from the top portion of the head so that when the boom 6 is extended, the reflector and its cord may be moved within the head and positioned as shown in Figures 6 and 16, particularly Figure 16. As soon as the reflector is positioned as shown in this view, the splash tank is lifted by dropping the drum casing 203. At this time the splash tank will be positioned as shown in Figure 6. The reflector will be firmly held so that the brushes 90, 87, and 102 may be operated for cleaning the outside and the inside of the reflector and the light 71. While the splash tank 68 is being moved from the position shown in Figure 16 to that shown in Figure 6, the valve 118 is being opened.

The boom may be extended any distance by changing the volume of liquid passing into the propelling conduit 124. Normally the valve 118 remains closed. Thus it will be seen that by increasing the volume of water or other liquid in the propelling conduit, the boom may be extended accordingly. The volume of liquid may be controlled through the medium of the pump 186. No detailed description is necessary, since there are many pumps of standard construction which are adapted to be used in connection with my invention.

The construction is such that the head may be moved away from or toward the mast by extending or contracting the boom. Further than this, the head may be moved about the longitudinal axis of the mast through the medium of the cylinders 162 and 163 and their associated rams 165 and 166, respectively. The cylinders are, of course, operated by oil, or other suitable liquid, which is controlled by the pump 170.

The tank 2 is provided with the necessary amount of liquid, such as water, which is drawn therefrom through the medium of the pump 186, passed through the propelling conduit 124, and is returned to the tank through the medium of the conduit 122. As soon as the splash tank 68 has been lifted, the valve 118 is opened, at which time the necessary amount of liquid will pass through the tubes 116 and 119. This liquid is deposited upon both sides of the reflector.

The propelling conduit 124 rotates the gear 126, see Figure 16, which is in mesh with the gear 127. Rotation of the shafts 128 and 129 operates the chains 134 and 136. The chains in turn operate the brushes. The mast may be easily raised or lowered by changing the amount of oil passed into or out of the mast.

I claim:

1. In a washing device, the combination of a supporting base, a liquid supply tank carried by the base, a mast carried by the base, a boom having one end connected with the mast and the other end connected with a washing unit including a rotatable washing element, a rotatable conduit operatively associated with the washing element and in communication with the liquid supply tank, means for rotating said conduit whereby the washing element may be rotated, and means for forcing the liquid in the tank through the conduit to the washing unit.

2. In a washing device, the combination of a supporting base, a liquid supply tank carried by the base, a mast carried by the base, a boom having one end connected with the mast and the other end connected with a washing unit including a rotatable washing element, said boom comprising a plurality of telescopic sections, a rotatable conduit operatively associated with the washing element and in communication with the liquid supply tank, said conduit comprising a plurality of telescopic sections, means for rotating said conduit whereby the washing element may be rotated, and means for forcing the liquid through the conduit to the washing unit.

3. In a washing device, the combination of a supporting base, a liquid supply tank carried by the base, a mast carried by the base and comprising a plurality of telescopic sections, means for extending and retracting the mast, a boom having one end connected with the mast and the other end connected with a washing unit including a rotatable washing element, said boom comprising a plurality of telescopic sections, a rotatable conduit operatively associated with the washing element and in communication with the liquid supply tank, said conduit being connected with the mast and boom and comprising a plurality of telescopic sections for being extended and retracted with the mast and boom, power means for rotating the conduit whereby the washing element may be rotated, and means for forcing the liquid in the tank through the conduit to the washing unit.

4. In a washing device, the combination of a supporting base, a liquid supply tank carried by the base, a mast carried by the base and comprising a plurality of telescopic sections, means for extending and retracting the mast, a boom having one end connected with the mast and the other end connected with a washing unit including a rotatable washing element, said boom comprising a plurality of telescopic sections, a rotatable conduit operatively associated with the washing element and in communication with the liquid supply tank, said conduit being connected with the mast and boom and comprising a plurality of telescopic sections for being extended and retracted with the mast and boom, power means for rotating the conduit whereby the washing element may be rotated, means for forcing the liquid in the tank through the conduit to the washing unit, and means operatively associated with the power means for rotating the mast.

5. In a washing device, the combination of a supporting base, a liquid supply tank carried by the base, a mast carried by the base and comprising a plurality of telescopic sections, means for extending and retracting the mast, a boom having one end connected with the mast and the other end connected with a washing unit including a rotatable washing element, a rotatable conduit operatively associated with the washing element and in communication with the liquid supply tank, said conduit being connected with the mast and comprising a plurality of telescopic sections for being extended and retracted with the mast, means for rotating the conduit whereby the washing element may be rotated, and means for forcing the liquid in the tank through the conduit to the washing unit.

6. In a washing device, a washing unit comprising a cover and a casing, said casing being movable toward and away from the cover, a rotatable washing element disposed in the casing, means for rotating the washing element, said cover being provided with a radial opening therein extending to the periphery thereof for receiving the cord of a suspended lamp bulb when the casing is positioned away from the cover.

7. In a washing device, a washing unit comprising a cover and a casing, means for moving said casing to and from the cover, a rotatable washing element disposed in the casing, a rotatable conduit operatively connected with the washing element for rotating the same and for supplying a liquid thereto, said cover being provided with a radial opening therein extending to the periphery thereof for receiving the cord of a suspended lamp bulb when the casing is moved away from the cover, and a valve connected with the conduit and operable by the casing for opening the valve when the casing is moved to the cover and closing the valve when the casing is moved from the cover.

ROY E. HUNTINGTON.